(12) United States Patent
Moon

(10) Patent No.: US 7,659,950 B2
(45) Date of Patent: Feb. 9, 2010

(54) LIQUID CRYSTAL DISPLAY MODULE HAVING ELECTRODE PAIRS IN PARTITIONED LIGHT EMITTING SPACES, RESPECTIVELY

(75) Inventor: Jeong Min Moon, Gunpo-shi (KR)

(73) Assignee: LG Display Co., Ltd., Seoul (KR)

( * ) Notice: Subject to any disclaimer, the term of this patent is extended or adjusted under 35 U.S.C. 154(b) by 38 days.

(21) Appl. No.: 12/068,303

(22) Filed: Feb. 5, 2008

(65) Prior Publication Data
US 2008/0211994 A1 Sep. 4, 2008

Related U.S. Application Data

(62) Division of application No. 10/952,772, filed on Sep. 30, 2004, now Pat. No. 7,349,042.

(30) Foreign Application Priority Data

Oct. 22, 2003 (KR) .............................. P2003-73868

(51) Int. Cl.
*G02F 1/335* (2006.01)
(52) U.S. Cl. .......................................... 349/61; 349/62
(58) Field of Classification Search .................. 349/61, 349/58, 62; 362/31, 36, 26
See application file for complete search history.

(56) References Cited

U.S. PATENT DOCUMENTS

| 3,253,175 | A | | 5/1966 | Holle |
| 3,258,630 | A | | 6/1966 | Scott |
| 4,945,350 | A | * | 7/1990 | Kawamura .................. 345/102 |
| 5,914,560 | A | * | 6/1999 | Winsor ....................... 313/493 |
| 6,538,373 | B2 | | 3/2003 | Fujimoto et al. |
| 7,141,931 | B2 | | 11/2006 | Park et al. |
| 7,215,079 | B2 | * | 5/2007 | Park et al. ................... 313/607 |
| 2003/0132711 | A1 | | 7/2003 | Yoo et al. |

* cited by examiner

*Primary Examiner*—Mike Qi
(74) *Attorney, Agent, or Firm*—Birch, Stewart, Kolasch & Birch, LLP

(57) ABSTRACT

A liquid crystal display module includes: a liquid crystal display panel, a surface light-emitting lamp irradiating light to the liquid crystal display panel by a surface light-emission, and a power source supplying an electric power to the surface light-emitting lamp. The surface light-emitting lamp includes a frame having a light-emitting space, a first barrier rib formed partitioning the lamp into light-emitting spaces and electrode pairs for generating electric fields in the light-emitting spaces, respectively.

14 Claims, 12 Drawing Sheets

LIQUID CRYSTAL DISPLAY MODULE HAVING ELECTRODE PAIRS IN PARTITIONED LIGHT EMITTING SPACES, RESPECTIVELY

This is a Divisional Application of pending U.S. application Ser. No. 10/952,772 filed on Sep. 30, 2004, now U.S. Pat. No. 7,349,042 which claims benefit under 35 U.S.C. §119 of Korean Patent Application No. P2003-73868 filed in Korea on Oct. 22, 2003, the contents of both are hereby incorporated by reference.

BACKGROUND OF THE INVENTION

1. Field of the Invention

The invention relates to a liquid crystal display module, more particularly, to a liquid crystal display module having improved display quality and productivity.

2. Description of the Related Art

Liquid crystal display (hereinafter, LCD) devices trend towards gradually wider applications due to their lightness, thinness, and low power consumption. In accordance with this trend, LCD devices find use in office automation devices, audio/video devices and the like.

An LCD device adjusts the transmittance of light in accordance with an image signal applied to multiple control switches arranged in a matrix-type array in order to display desired pictures in a screen.

Generally, an LCD device includes a liquid crystal display module and a driving circuitry for driving the liquid crystal display module.

The liquid crystal display module includes a liquid crystal display panel having liquid crystal cells arranged in a matrix between two glass substrates, and a backlight unit irradiates light onto the liquid crystal display panel. The liquid crystal display panel and the backlight unit must engage with each other in an integral shape so as to prevent a light loss, and also be protected from damage caused by external impacts. To this end, a casing encloses the back light unit as well as the edges of the liquid crystal display panel.

There are two types of back light units for a liquid crystal display module: i) a direct-below-type, and ii) an edge-type.

The edge-type back light unit has a fluorescent lamp installed on the outside of a light guide plate, and thus the light from the fluorescent lamp is incident to the entire surface of the liquid crystal display panel by using a transparent light guide plate. The direct-below-type back light unit has a light source arranged at a rear surface of the liquid crystal display panel, and the light source directly radiates light to the entire surface of the liquid crystal display panel. Compared with the edge-type back light unit, the direct-below-type back light unit has advantages in that multiple light sources can be used to improve brightness and that the light-emitting surface can be widened.

FIG. 1 shows a perspective view illustrating a related art liquid crystal display module employing a direct-below-type back light unit. FIG. 2 shows a sectional view representing the liquid crystal display module taken along line I-I' in FIG. 1.

In FIG. 1 and FIG. 2, the liquid crystal display module 1 employing the direct-below-type back light unit includes a main support 14, a back light unit and a liquid crystal display panel 6 stacked in an interior of the main support 14. A top case 2 encloses the edge of the liquid crystal display panel 6 and the side of the main support 14.

The liquid crystal display panel 6 includes a color filter array substrate 5 and a thin film transistor (TFT) array substrate 3. Liquid crystal materials are injected between the color filter array substrate 5 and the TFT array substrate 3. The liquid crystal display panel 6 is provided with a spacer (not shown) that constantly keeps a gap between the color filter array substrate 5 and the TFT array substrate 3. The color filter array substrate 5 is provided with a color filter, a common electrode and a black matrix (not shown). Signal lines such as a data line and a gate line (not shown) are formed on the TFT array substrate 3 of the liquid crystal display panel 6. A thin film transistor (TFT) is formed at an intersection between the data line and the gate line. The TFT switches a data signal to be transmitted from the data line to the liquid crystal cell in response to a scanning signal (i.e., a gate pulse) from the gate line. A pixel electrode is formed at a pixel area between the data line and the gate line. A pad area is formed at one side of the TFT array substrate 3 and is connected to each of the data line and the gate line. A tape carrier package (not shown), having a driver integrated circuit mounted thereon for applying a driving signal to the TFT, is attached onto the pad area. This tape carrier package applies a data signal from the driver integrated circuit to the data line. Further, the tape carrier package supplies a scanning signal to the gate line.

An upper polarizing sheet attaches onto the color filter array substrate 5 of the liquid crystal display panel 6, and a lower polarizing sheet attaches onto the rear side of the TFT array substrate 3 of the liquid crystal display panel 6.

The main support 14 is made from a molded material, and its inner lateral wall surface is molded into a stepped coverage face. The stepped coverage face has a securing part formed therein in which the back light unit and the liquid display panel 6 are accommodated. The back light unit that irradiates light onto the liquid crystal display panel 6, and the liquid crystal display panel 6 that adjusts the transmittance of light irradiated from the back light unit to display a picture, are stacked inside the main support 14.

The back light unit includes multiple lamps 20 irradiating light onto the liquid crystal display panel 6, multiple lamp holders 22 on which the lamps 20 are fixedly mounted, a diffusion plate 10 that diffuses incident light received from the lamps 20 to irradiate the light onto the liquid crystal display panel 6, a lamp housing 18 arranged on the rear surface of the lamps 20, and multiple optical sheets 8 stacked on the diffusion plate 10.

A cold cathode fluorescent lamp is mainly used for the lamps 20. Each of the lamps 20 includes a glass tube, inert gases within the glass tube, and a cathode and an anode installed at the respective opposite ends of the glass tube. The inert gases are injected in the glass tube. A passivation film is formed on the inside wall of the glass tube, and phosphorus is applied to the inside wall of the glass tube. The light generated from the lamps 20 is incident to the diffusion plate 10.

The diffusion plate 10 directs the light received from the lamps 20 toward the front surface of the liquid crystal display panel 6, and the diffusion plate 10 diffuses the light to have a uniform distribution over a broad area, so that the diffused light is irradiated to the liquid crystal display panel 6. The diffusion plate 10 includes a transparent resin film having both surfaces coated with light-diffusion materials.

The lamp housing 18 includes a reflection sheet 12 and a bottom cover 16 arranged on the rear surface of the reflection sheet 12.

The bottom cover 16 has a bottom surface and an inclined surface extending from the bottom surface. That is, the bottom surface and the inclined surface of the bottom cover 16 are bent like a step. The reflection sheet 12 is stacked on the bottom cover 16.

The reflection sheet 12 is arranged on the rear surface of the lamp 20. The reflection sheet 12 is made of a light-reflecting material that takes the same shape as the bottom cover 16. Moreover, the reflection sheet 12 has a bottom surface that overlaps the bottom surface of the bottom cover 16 and also has an inclined surface correspondingly bent to the inclined surface of the bottom cover 16. The reflection sheet 12 adheres to the bottom surface and the inclined surface of the bottom cover 16 using a double-sided adhesive tape (not shown). The reflection sheet 12 reflects the light directed toward the rear surface and the side surface of the lamps 20 toward the liquid crystal display panel 6 to thereby improve the efficiency of the light irradiated on the liquid crystal display panel 6.

The light exiting from the diffusion plate 10 serves as diffused light that widens the viewing angle. The efficiency of the light incident to the liquid crystal display panel 6 becomes high when the incident light is perpendicular to the liquid crystal display panel 6. To this end, the optical sheets 8 are disposed on the diffusion plate 10. The optical sheets 8 make the light exiting from the diffusion plate 10 to project perpendicularly, thereby improving the efficiency of the light. According to the scheme, the light exiting from the diffusion plate 10 reaches the liquid crystal display panel 6 via the optical sheets 8.

The top case 2 has a square band shape having a plane part and a side part bent perpendicularly. The top case 2 encloses the edge of the liquid crystal display panel 6 and the main support 14.

FIG. 3 shows a perspective view illustrating a related art back light unit of the liquid crystal display module shown in FIG. 1.

High voltage generates heat in the glass tube of the lamp 20 used for a light source of the related art back light unit shown in FIG. 3. If the heat occurs in the glass tube, then an exhaustion amount of mercury gas filled inside the glass tube largely increases. As a result, the brightness of light emitted from the lamp 20 becomes uneven, thereby lowering the reliability and reducing the life span of the lamp 20. Further, if any one of multiple lamps 20 becomes damaged or is inferior, then the brightness of the back light unit suddenly decreases, and implementing a scanning back light driving method capable of improving the display quality of the liquid crystal display module 1 by controlling the brightness of each part of the back light unit becomes impossible. Also, the complex arrangement of the back light unit requires a lot of time to assemble the liquid crystal display module 1, which entails lower productivity.

SUMMARY OF THE INVENTION

Accordingly, an object of the invention provides a liquid crystal display module capable of improving display quality and productivity.

In order to achieve these and other objects of the invention, a liquid crystal display module according to an embodiment of the invention includes: a liquid crystal display panel, a surface light-emitting lamp irradiating light to the liquid crystal display panel by a surface light-emission, and a power source supplying an electric power to the surface light-emitting lamp. The surface light-emitting lamp includes a frame having a light-emitting space, a first barrier rib formed within the frame and partitioning the light-emitting space into multiple partitioned light-emitting spaces, multiple electrode pairs for producing electric fields in the partitioned light-emitting spaces, respectively, and a second barrier rib defining a light-emitting path of each of the partitioned light-emitting spaces. A transparent substrate is arranged on the frame.

In the invention, an inert gas can be filled in the partitioned light-emitting spaces. A phosphor can be applied to an inside wall of each of the partitioned light-emitting spaces. The power source can include multiple power sources, each of which supplies the electric power to each of the electrode pairs, respectively. The power source can commonly supply the electric power to the electrode pairs.

The invention, in part, pertains to a liquid crystal display module that includes a liquid crystal display panel, a surface light-emitting lamp irradiating to the liquid crystal display panel by a surface light-emission, and a power source supplying an electric power to the surface light-emitting lamp. The surface light-emitting lamp includes a frame having multiple light-emitting spaces, multiple electrode pairs for generating electric fields in the light-emitting spaces, respectively, and a transparent substrate arranged on the frame.

In the invention, an inert gas is filled in the light-emitting spaces. A phosphor can be applied to an inside wall of each of the light-emitting spaces. The electrode pairs can include multiple first electrodes, each first electrode generating an electric field in each of the light-emitting spaces, and multiple second electrodes, each second electrode being corresponding to the first electrode and having multiple protrusions. Each of the protrusions can protrude toward the first electrode adjacent to the second electrode. The power source can include multiple power sources, each power source supplying the electric power to each of the electrode pairs, respectively. The power source can commonly supply the electric power to each of the electrode pairs.

The invention, in part, pertains to a surface light-emitting lamp for a display that includes a frame having a light-emitting space, at least one first barrier rib formed within the frame and partitioning the light-emitting space into multiple partitioned light-emitting spaces, multiple electrode pairs for producing electric fields in the partitioned light-emitting spaces, respectively, and at least one second barrier rib defining a light-emitting path of each of the partitioned light-emitting spaces.

The invention, in part, pertains to a surface light-emitting lamp for a display that includes a frame having a plurality of light-emitting spaces, and a plurality of electrode pairs for generating electric fields in the light-emitting spaces, respectively.

BRIEF DESCRIPTION OF THE DRAWINGS

These and other objects of the invention will be apparent from the following detailed description of the embodiments of the invention with reference to the accompanying drawings, in which.

DETAILED DESCRIPTION

Reference will now be made in detail to the preferred embodiments of the invention, examples of which are illustrated in the accompanying drawings.

Hereinafter, the preferred embodiments of the invention will be described in detail with reference to FIGS. 4 to 12.

Figure 1:
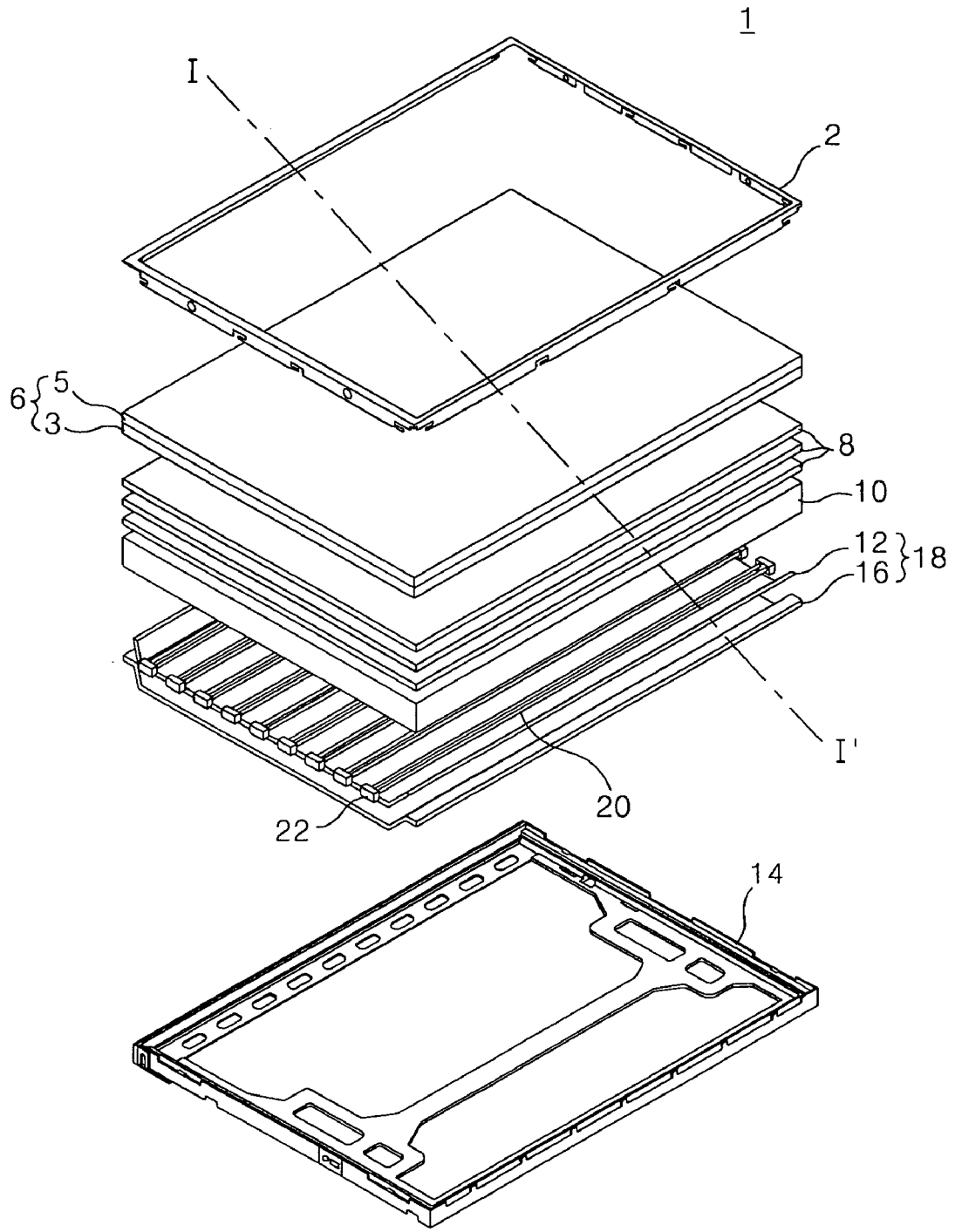
FIG. 1 shows a perspective view illustrating a related art liquid crystal display module employing a direct-below-type back light unit.
Figure 2:
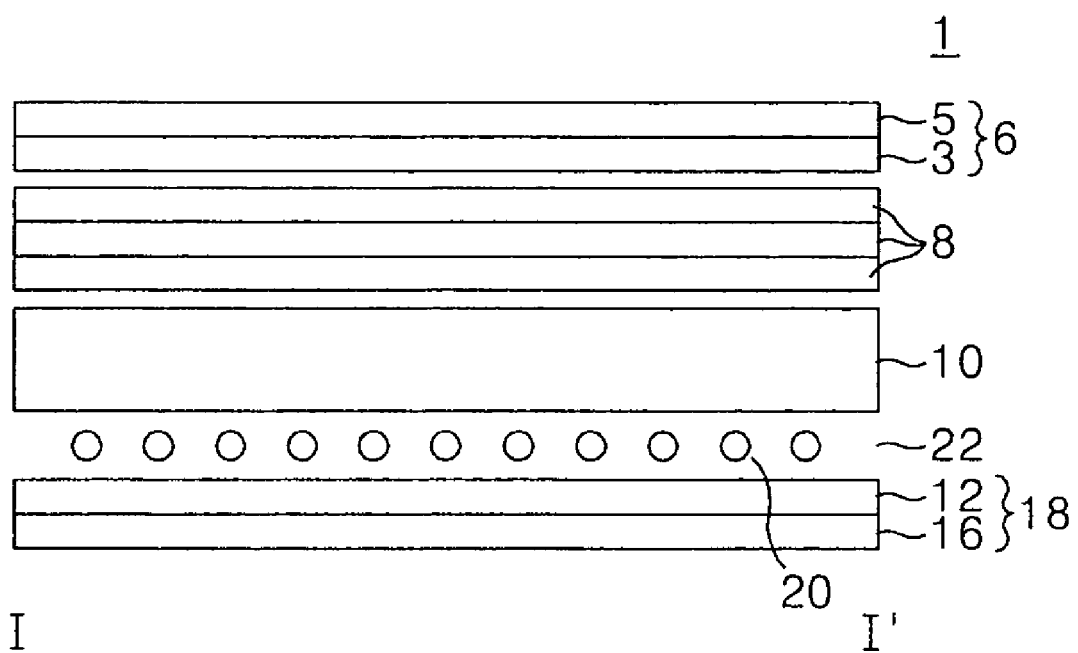
FIG. 2 shows a sectional view illustrating the liquid crystal display module taken along line I-I' in FIG. 1.
Figure 3:
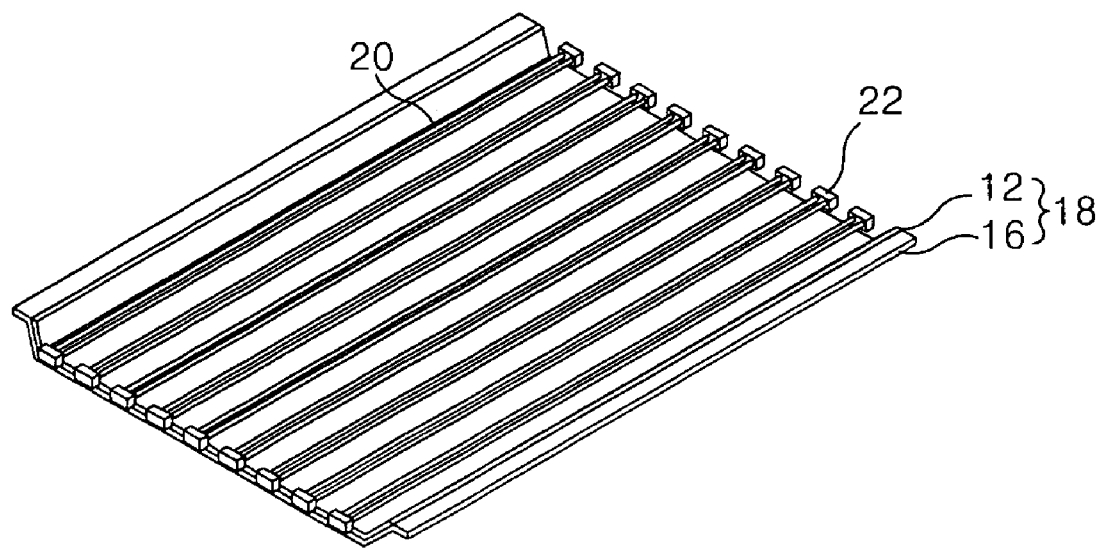
FIG. 3 shows a perspective view illustrating the back light unit of the liquid crystal display module shown in FIG. 1.
Figure 4:
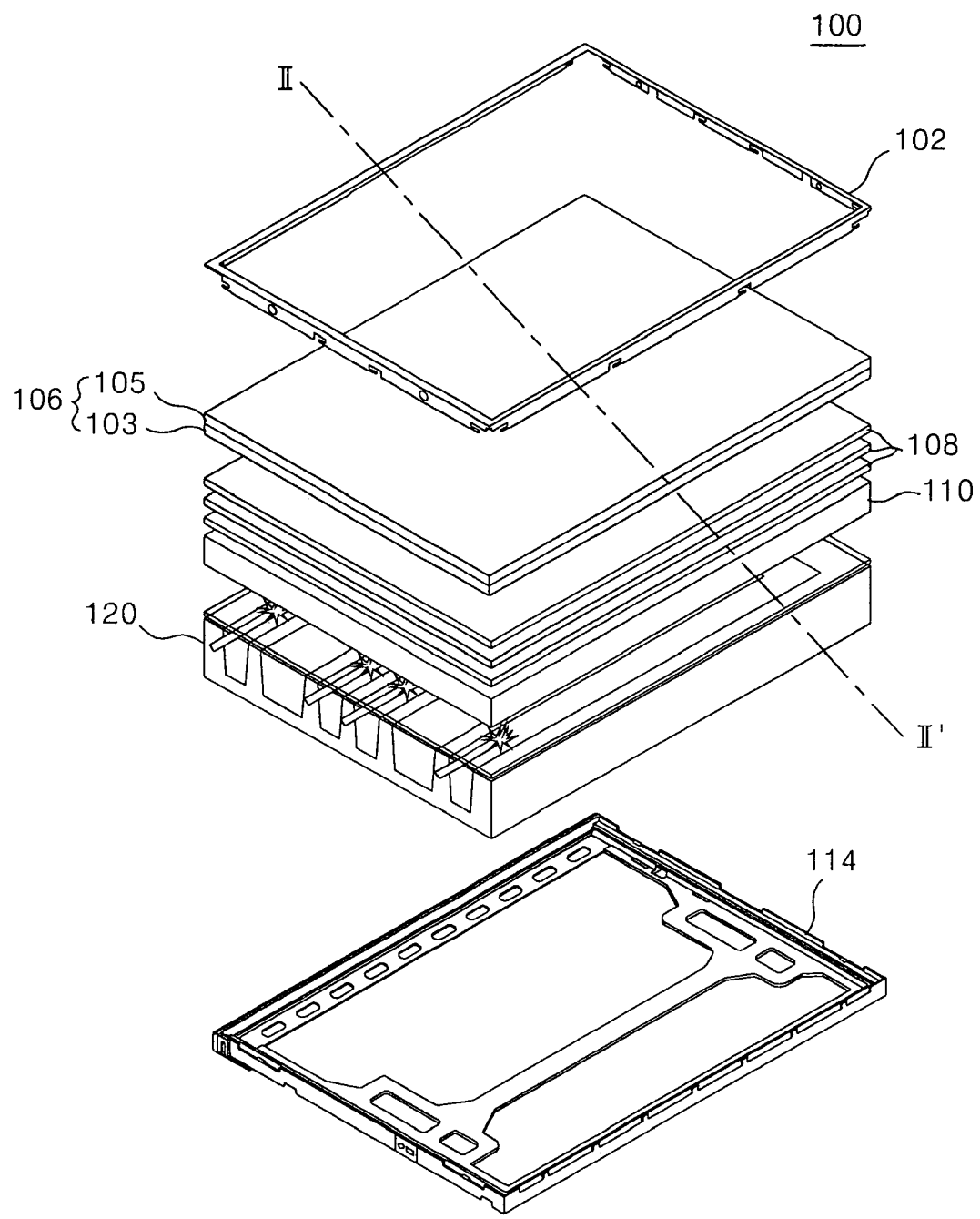
FIG. 4 shows a perspective view illustrating a liquid crystal display panel according to a first embodiment of the invention.
Figure 5:
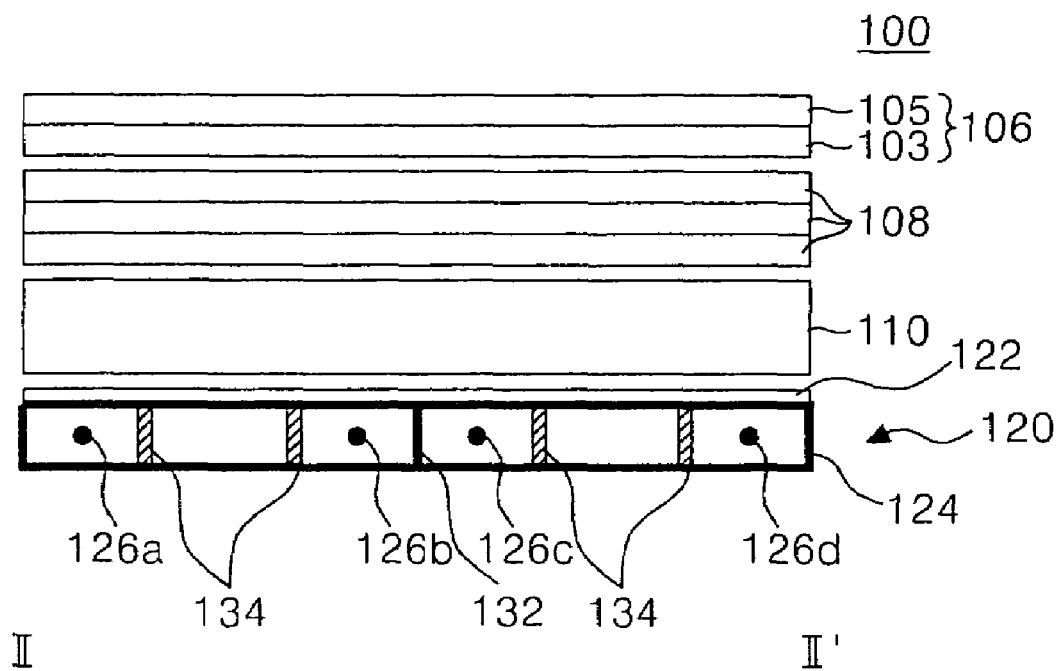
FIG. 5 shows a sectional view illustrating the liquid crystal display module taken along line II-II' in FIG. 4.

FIG. 4 shows a perspective view illustrating a liquid crystal display panel according to a first embodiment of the invention. FIG. 5 depicts a sectional view illustrating the liquid crystal display module taken along line II-II' in FIG. 4.

FIG. 4 and FIG. 5 depict a liquid crystal display module 100 according to the first embodiment of the invention that includes a main support 114, a back light unit and a liquid crystal display panel 106 stacked inside of the main support 114. A top case 102 for encloses the edge of the liquid crystal display panel 106 and the side of the main support 114.

The liquid crystal display panel 106 includes a thin film transistor (TFT) array substrate 103 and a color filter array substrate 105. Liquid crystal materials are injected between the TFT array substrate 103 and the color filter array substrate 105. The liquid crystal display panel 106 includes a spacer (not shown) for keeping a constant gap between the TFT array substrate 103 and the color filter array substrate 105. The color filter array substrate 105 is provided with a color filter, a common electrode and a black matrix (not shown). Signal lines such as a data line and a gate line (not shown) are formed over the TFT array substrate 103 of the liquid crystal display panel 106. A thin film transistor (TFT) is formed at an intersection between the data line and the gate line. The TFT switches a data signal transmitted from the data line to the liquid crystal cell in response to a scanning signal (i.e., a gate pulse) from the gate line. A pixel electrode is formed at a pixel area between the data line and the gate line. A pad area is formed at one side of the TFT array substrate 103 and is connected to each of the data line and the gate line. A tape carrier package (not shown), having a driver integrated circuit mounted thereon for applying a driving signal to the TFT, attaches onto the pad area. This tape carrier package applies a data signal from the driver integrated circuit to the data line. Further, the tape carrier package supplies the scanning signal to the gate line.

An upper polarizing sheet is attached over the color filter array substrate 105 of the liquid crystal display panel 106, and a lower polarizing sheet is attached over the rear side of the TFT array substrate 103 of the liquid crystal display panel 106.

The main support 114 is made from a molded material (typically a thermoplastic resin), and its inner lateral wall surface is molded into a stepped cover face. The stepped cover face has a securing part in which the back light unit and the liquid display panel 106 are disposed. The back light unit irradiates light onto the liquid crystal display panel 106, and the liquid crystal display panel 106 adjusts the transmittance of the irradiated light to display a picture. These components are stacked inside of the main support 114.

The back light unit includes a surface light-emitting lamp 120 for irradiating light toward the liquid crystal display panel 106, a diffusion plate 110 for diffusing incident light received from the surface light-emitting lamp 120, and multiple optical sheets 108 stacked over the diffusion plate 110 in order to improve the efficiency of the light exiting from the diffusion plate 110.

Figure 6:
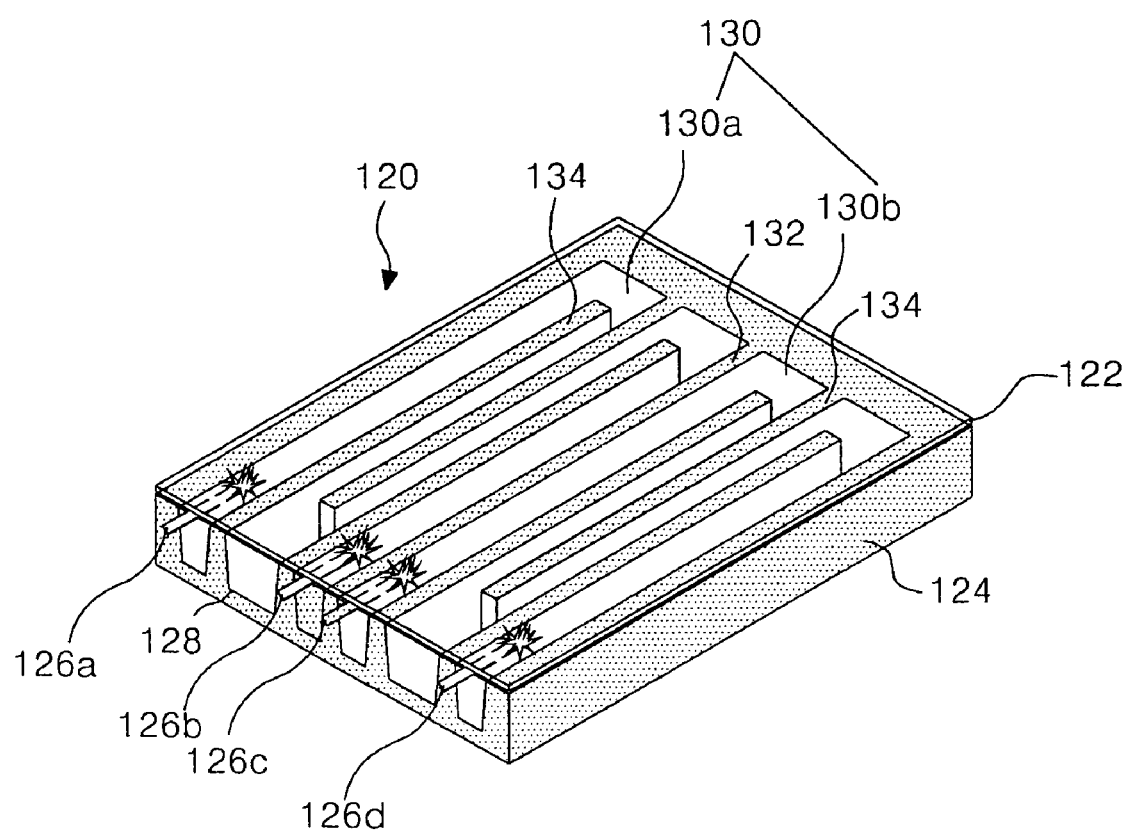
FIG. 6 shows a perspective view illustrating a surface light-emitting lamp for use in the liquid crystal display module according to the first embodiment of the invention.

The surface light-emitting lamp 120, as shown in FIG. 6, includes a frame 124 having multiple light-emitting spaces 130a and 130b formed therein, multiple first electrodes 126a and 126c, and multiple second electrodes 126b and 126d applying an electric field to each of the light-emitting spaces 130a and 130b. A first barrier rib 132 partitions a light-emitting space 130 into the light-emitting spaces 130a and 130b, and a second barrier rib 134 defines a light-emitting path of each of the light-emitting spaces 130a and 130b. A transparent substrate 122 is arranged on the frame 124. A phosphor 128 is applied to each of the light-emitting spaces 130a and 130b. In connection with the surface light-emitting lamp 120 as set forth above, it should be understood that FIG. 6 shows only a portion of an entire surface light-emitting lamp. That is, there is no practical limit to the size of the lamp.

The diffusion plate 110 diffuses the light received from the surface light-emitting lamp 120, and the light therefore has a uniform distribution over a broad area so that the diffused light irradiates toward the liquid crystal display panel 106. The diffusion plate 110 includes a transparent resin film whose both surfaces are coated with light-diffusing materials. The efficiency of the light incident to the liquid crystal display panel 106 elevates when the incident light is perpendicular (or almost perpendicular) to the liquid crystal display panel 106. To this end, the optical sheets 108 are disposed over the diffusion plate 110.

The optical sheets 108 render the light beams exiting from the diffusion plate 110 to be perpendicular, thereby improving the efficiency of the light. Accordingly, the light emitted from the diffusion plate 110 reaches the liquid crystal display panel 106 via the optical sheets 108.

The top case 102 has a shape of a square band having a plane part and a perpendicularly bent side part. The top case 102 serves to enclose the edge of the liquid crystal display panel 106 and the main support 114.

Figure 7:
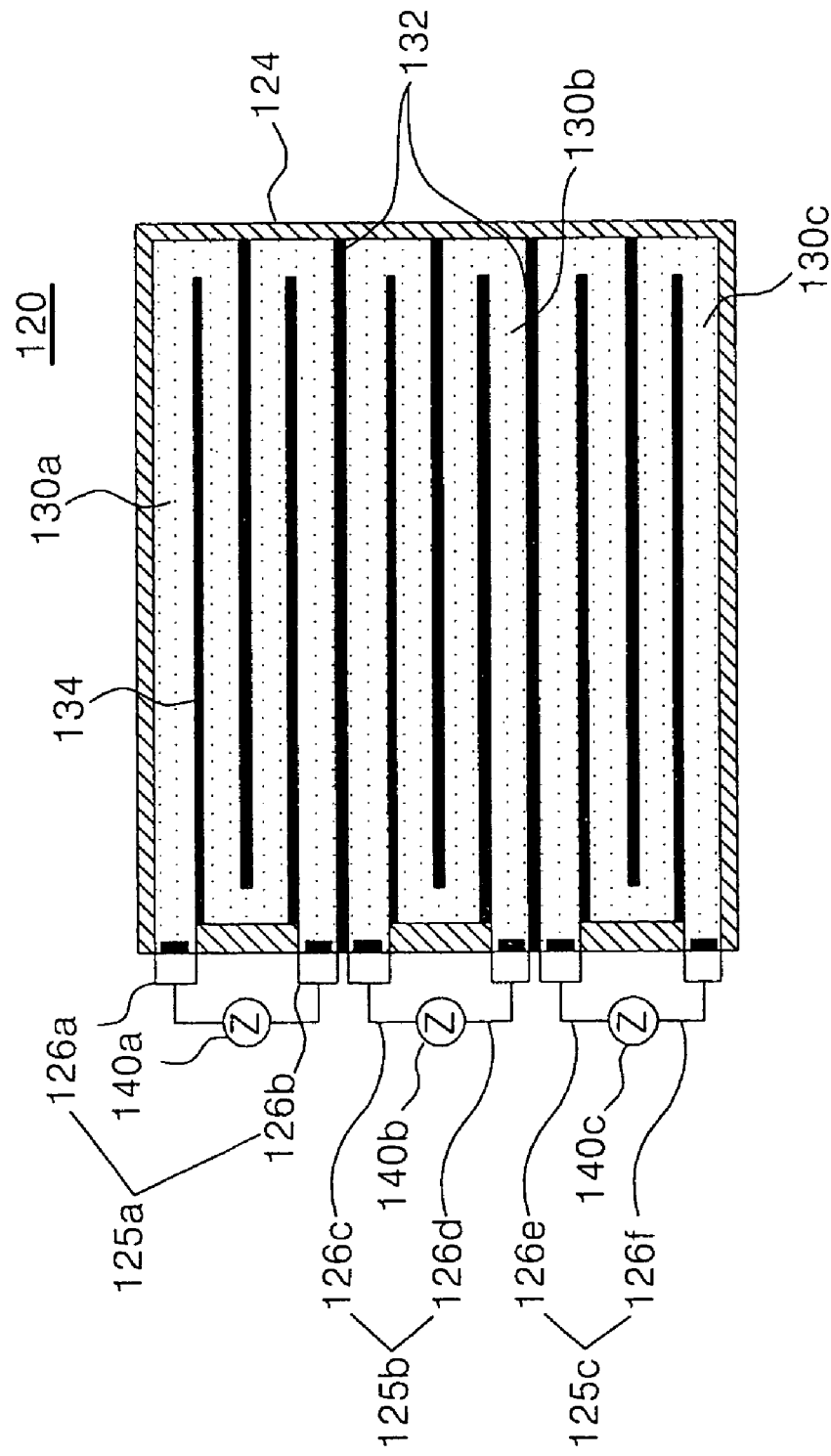
FIG. 7 shows a plan view illustrating the surface light-emitting lamp for use in the liquid crystal display module according to the first embodiment of the invention.

FIG. 7 shows a plan view illustrating the surface light-emitting lamp of the liquid crystal display module according to the first embodiment of the invention.

FIG. 7 shows the surface light-emitting lamp 120 beings partitioned into multiple light-emitting spaces 130a, 130b and 130c by multiple first barrier ribs 132 crossing an inside of the surface light-emitting lamp 120. Each of the light-emitting spaces 130a, 130b and 130c can independently emit (e.g., turned on or turned off) by an electric field applied to each of the light-emitting spaces 130a, 130b and 130c.

Inert gases (e.g., He, Ne, Xe, or a mixture of these gases) fill each of the light-emitting spaces 130a, 130b and 130c. The phosphor 128 is applied to the inside wall of each of the light-emitting spaces 130a, 130b and 130c.

The second barrier ribs 134 are formed in the respective light-emitting spaces 130a, 130b and 130c, thereby forming the light-emitting path in the respective light-emitting spaces 130a, 130b and 130c. Multiple first electrodes 126a, 126c and 126e, and multiple second electrodes 126b, 126d and 126f apply the electric field inside the respective light-emitting spaces 130a, 130b and 130c, and these electrodes are formed at both edges at one side of the respective light-emitting spaces 130a, 130b and 130c. According to this arrangement as set forth above, the field applied to the first light-emitting space 130a is the electric field produced by a first electrode pair 125a having the first electrode 126a and the second electrode 126b. Also, the field applied to the second light-emitting space 130b is the electric field produced by a second electrode pair 125b having the first electrode 126c and the second electrode 126d. Similarly, the field applied to the third light-emitting space 130c is the electric field produced by a third electrode pair 125c having the first electrode 126e and the second electrode 126f.

Alternating current (AC) voltages of several hundreds volts (V) and having a frequency of several tens to several hundreds Hz are applied from power sources 140a, 140b and 140c to the first to third electrode pairs 125a, 125b and 125c, respectively. The AC voltages cause electric fields to be produced between the first electrodes 126a, 126c, 126e and the second electrodes 126b, 126d, 126f in the light-emitting spaces 130a, 130b and 130c, respectively. The electric fields produced between the first electrodes 126a, 126c, 126e and the second electrodes 126b, 126d, 126f induce discharges from the inert gases filled in the light-emitting spaces 130a, 130b and 130c. Thus, ultraviolet rays are generated by the electric fields produced between the first electrodes 126a, 126c, 126e and the second electrodes 126b, 126d, 126f, by causing discharges from the inert gases filled in the light-emitting spaces 130a, 130b and 130c. The surface light-emitting lamp 120 thus irradiates visible light by a glow discharge that is generated from the ultraviolet rays interacting with the phosphor, and light irradiates from the entire surface of the surface light-emitting lamp 120. This method for causing glow discharge is disclosed in U.S. Pat. Nos. 3,258,630 and 3,253,175, which are incorporated herein by reference.

Figure 8:
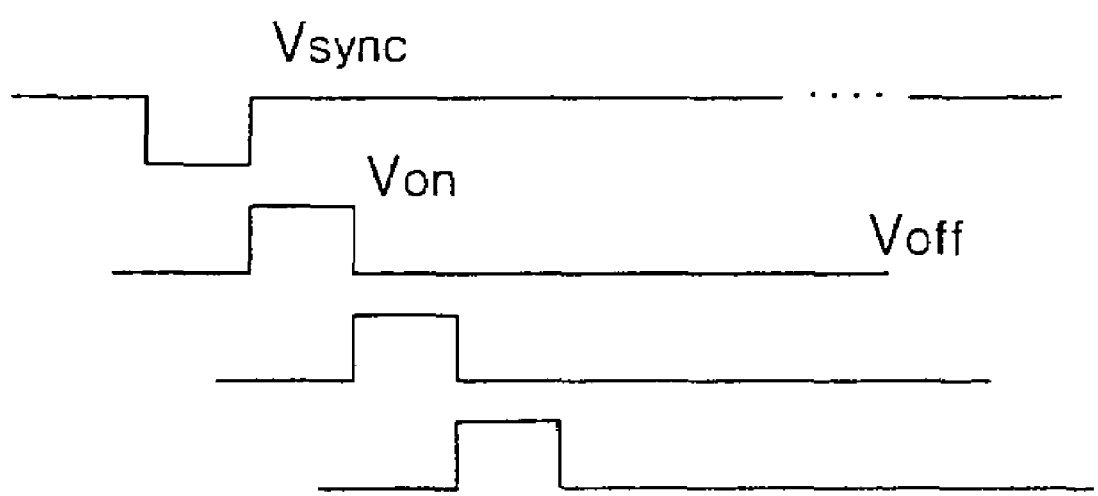
FIG. 8 shows the driving waveforms necessary to drive the liquid crystal display module according to the first embodiment of the invention.

FIG. 8 shows the driving waveforms necessary to drive the liquid crystal display module according to the first embodiment of the invention.

A method of driving the liquid crystal display module 100 according to the first embodiment of the invention will be described in reference to FIG. 8.

The liquid crystal display module 100 according to the first embodiment of the invention allows the light-emitting spaces 130a, 130b and 130c to independently emit by applying the scanning back-light driving method.

In the liquid crystal display panel 106, one screen starts on a basis of a vertical synchronization signal Vsync. In the inventive liquid crystal display module 100, a starting point at which a driving voltage for activating the surface light-emitting lamp 120 stems from the vertical synchronization signal Vsync. When the vertical synchronization signal Vsync is applied, a voltage Von is sequentially applied from each of the power sources 140a, 140b and 140c to each of the electrode pairs for a predetermined time period.

When the voltage Von is applied to each of the first to the third electrode pairs 125a, 125b and 125c from each of the power sources 140a, 140b and 140c, an electric field forms between each of the first electrodes 126a, 126c, 126e and each of the second electrodes 126b, 126d, 126f. As a result, a discharge is induced at the respective light-emitting spaces 130a, 130b and 130c of the surface light-emitting lamp 120, thereby emitting light at the light-emitting spaces 130a, 130b and 130c. When the voltage Von supplied from each of the power sources 140a, 140b and 140c is changed into a voltage Voff, an electric field does not form between the respective first electrodes 126a, 126c, 126e and the respective second electrodes 126b, 126d, 126f. As a result, none of the discharges are generated at the respective light-emitting spaces 130a, 130b and 130c. Thus, by above-mentioned method, the emission of the light-emitting space 130 is controlled. It is accordingly possible to control the independent emissions of the respective light-emitting spaces by their separate locations.

The surface light-emitting lamp 120 of the liquid crystal display module 100 according to the first embodiment of the invention can generate light with a brightness higher than that of the light source used in the related art liquid crystal display module 1. Further the light source can have the same thickness irrespective of the size (or the area) of a light-emitting surface, and it is therefore possible to reduce the thickness of the liquid crystal display module if the light source is employed in a large-scale liquid crystal display module.

In addition, the inventive liquid crystal display module 100 can drive the surface light-emitting lamp 120 by associating the emission of the surface light-emitting lamp 120 with picture data provided to the liquid crystal display module, so that an entire light-emitting surface is partially turned-on or turned-off, thereby enhancing the display quality of a moving picture. Further, it is possible to separately supply driving voltages or driving currents with values different from each other to the respective light-emitting spaces 130a, 130b and 130c so that the brightness of the respective light-emitting spaces 130a, 130b and 130c raises or lowers. As a result, it is possible to control the brightness of light by separate locations, thereby improving the display quality of the liquid crystal display module. Further, the construction of the back light unit is simplified to thereby reduce the time required to assemble the liquid crystal display module and thus to improve productivity.

The liquid crystal display module according to the second embodiment of the invention has constituent elements similar or identical to those of the liquid crystal display module according to the first embodiment of the invention except for the surface light-emitting lamp. Therefore, a detailed explanation of these components will be omitted for the sake of brevity.

Figure 9:
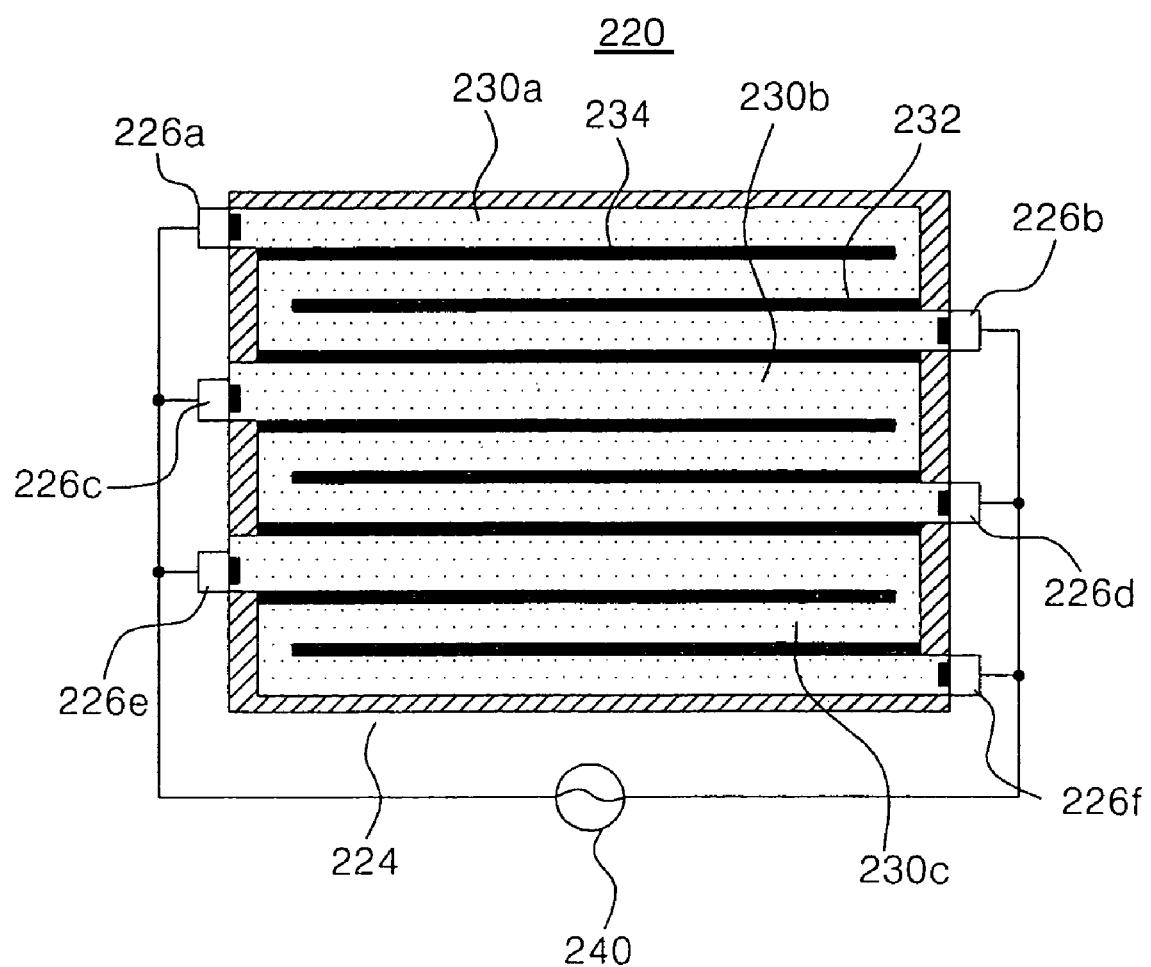
FIG. 9 shows a plan view illustrating a surface light-emitting lamp for use in a liquid crystal display module according to a second embodiment of the invention.

FIG. 9 depicts a plan view illustrating a surface light-emitting lamp for use in a liquid crystal display module according to a second embodiment of the invention.

FIG. 9 shows a surface light-emitting lamp 220 of a liquid crystal display module 200 that is partitioned into multiple light-emitting spaces 230a, 230b and 230c by multiple first barrier ribs 232 crossing an inside of the surface light-emitting lamp 220. Each of the light-emitting spaces 230a, 230b and 230c can be independently activated (i.e., turned on or turned off) by an electric field applied across each of the light-emitting spaces 230a, 230b and 230c.

Inert gases (e.g., He, Ne, Xe, or a mixture of these gases) fill each of the light-emitting spaces 230a, 230b and 230c. A phosphor is applied to the inside wall of each of the light-emitting spaces 230a, 230b and 230c.

The second barrier ribs 234 are formed in the respective light-emitting spaces 230a, 230b and 230c, thereby forming a light-emitting path in the respective light-emitting spaces 230a, 230b and 230c. Multiple first electrodes 226a, 226c and 226e, and multiple second electrodes 226b, 226d and 226f for applying the electric field inside the respective light-emitting spaces 230a, 230b and 230c are formed at a beginning point and an end point of the respective light-emitting spaces 230a, 230b and 230c, respectively. In this configuration, the electric field produced by a first electrode pair having the first electrode 226a and the second electrode 226b is applied to the first light-emitting space 230a. Also, the electric field produced by a second electrode pair having the first electrode 226c and the second electrode 226d is applied to the second light-emitting space 230b. Similarly, the electric field produced by a third electrode pair having the first electrode 226e and the second electrode 226f is applied to the third light-emitting space 230c.

An alternating current (AC) voltage of hundreds of volts (V) that has a frequency of tens to hundreds of Hz is commonly applied from a power source to each of the first to the third electrode pairs. The AC voltage causes electric fields to be produced between the first electrodes 226a, 226c, 226e and the second electrodes 226b, 226d, 226f in the light-emitting spaces 230a, 230b and 230c, respectively. The electric fields produced between the first electrodes 226a, 226c, 226e and the second electrodes 226b, 226d, 226f induce discharges from the inert gases filled in the light-emitting spaces 230a, 230b and 230c, respectively. Ultraviolet rays are thus generated by the electric fields produced between the first electrodes 226a, 226c, 226e and the second electrodes 226b, 226d, 226f upon the discharge of the inert gases filled in the respective light-emitting spaces 230a, 230b and 230c. The surface light-emitting lamp 220 then radiates visible light via a glow discharge where the generated ultraviolet rays cause the phosphor to emit visible light that irradiates from the front surface of the surface light-emitting lamp 220.

The liquid crystal display module 200 according to the second embodiment of the invention can simultaneously separately supply electric fields having values different from each other to the light-emitting spaces 230a, 230b and 230c of the surface light-emitting lamp 220, so that the brightness of the surface light-emitting lamp 220 is raised or lowered to improve the display quality. Further, the construction of the back light unit is simplified to thereby reduce the time required to assemble the liquid crystal display module and thus to improve production productivity.

A liquid crystal display module according to a third embodiment of the invention has constituent elements similar or identical to those of the liquid crystal display module according to the first embodiment of the invention except for the surface light-emitting lamp. Therefore, a detailed explanation of these elements will be omitted for the sake of simplicity.

Figure 10:
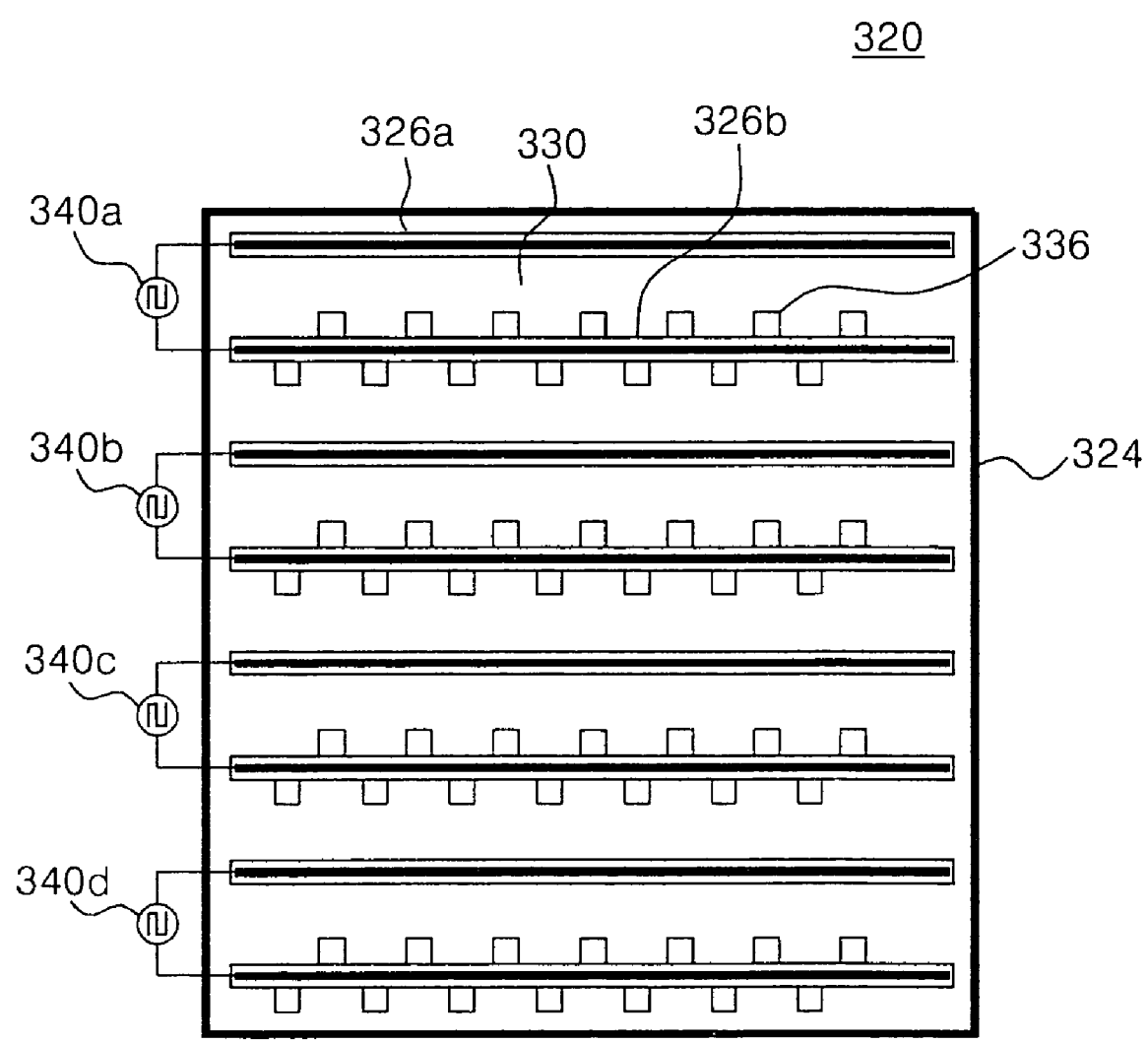
FIG. 10 shows a plan view illustrating a surface light-emitting lamp for use in a liquid crystal display module according to a third embodiment of the invention.

FIG. 10 shows a plan view illustrating a surface light-emitting lamp of the liquid crystal display module according to the third embodiment of the invention.

FIG. 10 shows a surface light-emitting lamp 320 of the liquid crystal display module according to the third embodiment of the invention that has a light-emitting space 330 therein for causing the emission of light within a frame 324.

Inert gases (e.g., He, Ne, Xe, or a mixture of these gases) fill the light-emitting space 330. A phosphor is applied to the inside wall of the light-emitting space 330. Regarding the surface light-emitting lamp 320, it should be understood that FIG. 10 shows a portion of an entire surface light-emitting lamp.

Multiple first electrodes 326a and multiple second electrodes 326b are formed in order to apply an electric field across the light-emitting space 330. The first electrodes 326a pair with the second electrodes 326b, to thereby form each electrode pair. A space between each of the electrode pairs is formed as an independent light-emitting space to which a separately controlled voltage can be applied.

The first electrode 326a is formed as a stripe type (i.e., as a strip or smooth element) and the second electrode 326b is formed to have multiple protrusions 336 perpendicularly protruding toward the first electrode 326a adjacent thereto (i.e., toward the light-emitting space). Although the protrusions are depicted as being rectangular, the invention is not restricted to this configuration, and any suitable protrusion shape (circular, oval, ellipsoid, etc.) can be used to practice the invention.

Alternating currents (AC) having voltages of hundreds of volts (V) and having frequencies of tens to hundreds of Hz are applied from power sources 340a to 340d to the electrode pairs, respectively.

Figure 11:
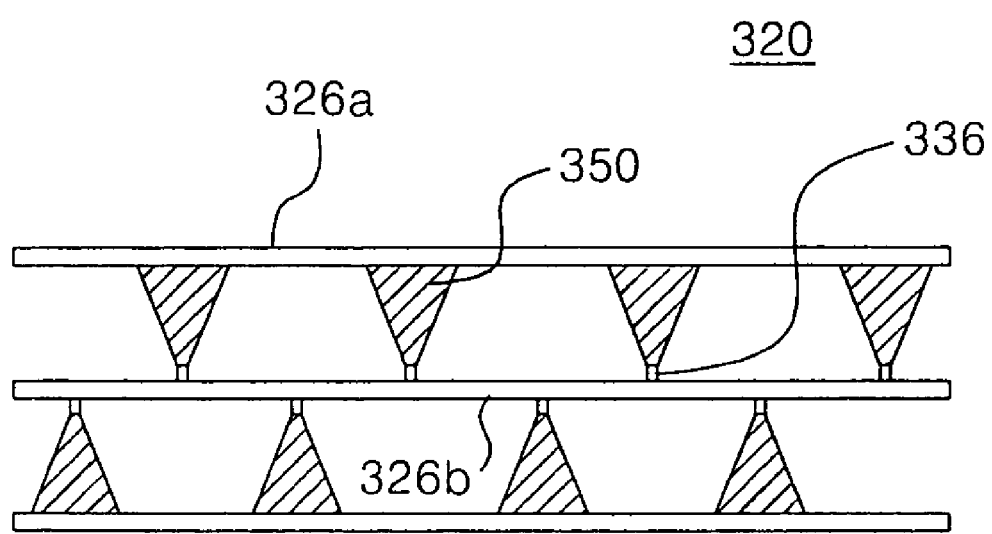
FIG. 11 shows a diagram representing a discharge phenomenon of the surface light-emitting lamp shown in FIG. 9.

Applying an AC voltage, to the first electrode 326a and the second electrode 326b of the respective electrode pairs, forms an electric field between the first electrode 326a and the second electrode 326b in the light-emitting space 330. Then, this electric field induces a discharge 350 from the inert gases filled in the light-emitting space 330. As shown in FIG. 11, ultraviolet rays generate upon the discharge of the inert gases filled in the light-emitting space 330 by the electric field formed between the first electrode 326a and the second electrode 326b. The ultraviolet rays then excite the phosphor, to thereby make the surface light-emitting lamp 320 to radiate. Accordingly, the surface light-emitting lamp 320 radiates visible light by the glow discharge of the UV-irradiated phosphor, so that the visible light irradiates from the entire surface of the light-emitting lamp 320.

The liquid crystal display module according to the third embodiment of the invention employs the scanning back light driving method used to drive the liquid crystal display module (similar to the first embodiment of the invention) to thereby control the emission of each light-emitting space formed between the first electrode 326a and the second electrode 326b. Thus, it is possible to control the independent emissions of the respective light-emitting spaces at their separate locations.

The surface light-emitting lamp 320 of the liquid crystal display module according to the third embodiment of the invention can generate light with a brightness higher than that of the light source used in a related art liquid crystal display module. Further, the invention renders it possible to make light sources with the same thickness irrespective of the size (or the area) of the light-emitting surface, and it is thus possible to reduce the thickness of the liquid crystal display module if the light source is employed in a large-scale liquid crystal display module.

The liquid crystal display module according to the invention can drive the surface light-emitting lamp 320 by associating the emission of the surface light-emitting lamp 320 with pictorial data provided to the liquid crystal display module, so that an entire light-emitting surface is partially turned-on or turned-off, thereby enhancing the display quality of a moving picture. In addition, it is possible to separately supply driving voltages or driving current with values different from each other to the respective light-emitting spaces 130a, 130b and 130c so that the brightness of the respective light-emitting spaces 130a, 130b and 130c is raised or lowered. Further, the construction of the back light unit is simplified to thereby save the time required to assemble the liquid crystal display module and thus to improve production productivity.

A liquid crystal display module according to a fourth embodiment of the invention has constituent elements similar or identical to those of the liquid crystal display module according to the third embodiment of the invention except for the surface light-emitting lamp. Therefore, a detailed explanation of these elements will be omitted for the sake of brevity.

Figure 12:
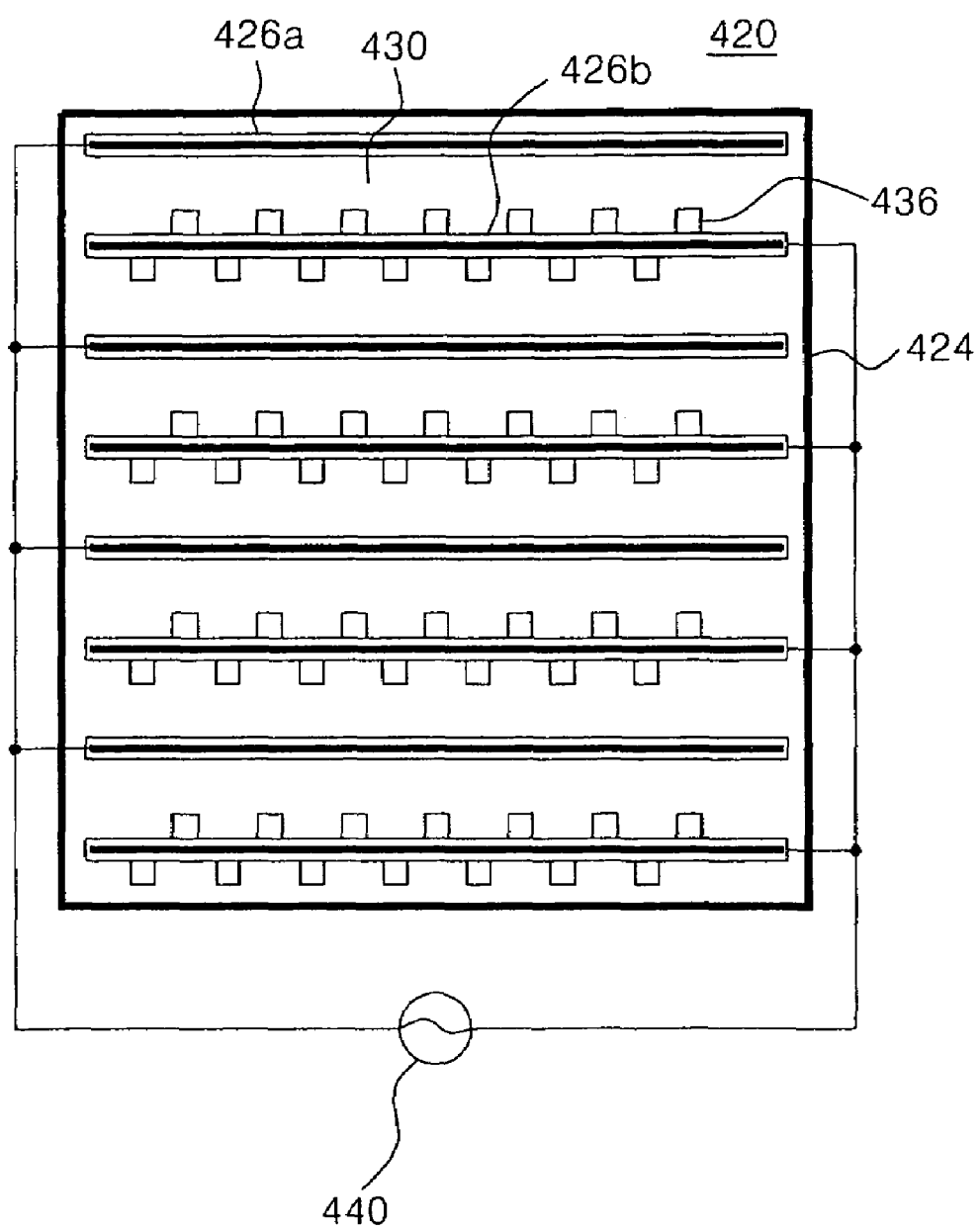
FIG. 12 shows a plan view illustrating a surface light-emitting lamp for use in a liquid crystal display module according to a fourth embodiment of the invention.

FIG. 12 shows a plan view illustrating the surface light-emitting lamp of the liquid crystal display module according to the fourth embodiment of the invention.

FIG. 12 shows a surface light-emitting lamp 420 that has a light-emitting space 430 formed therein in which light emits within a frame 424. Inert gases (e.g., He, Ne, Xe, or a mixture of these gases) fill the light-emitting space 430. A phosphor is applied to the inside wall of the light-emitting space 430. Multiple first electrodes 426a and multiple second electrodes 426b are formed in order to apply an electric field in the light-emitting space 430.

The first electrode 426a is formed as a stripe type and the second electrode 426b is formed having multiple protrusions 436 perpendicularly protruding toward the first electrode 426a adjacent thereto (i.e., into the light-emitting space).

The first electrodes 426a pair with the second electrodes 426b, to thereby form each electrode pair. The first electrode 426a and the second electrode 426b of the electrode pair are commonly provided with an alternating current (AC) voltage of hundreds of volts (V) having a frequency of tens to hundreds of Hz applied from one power source 440.

The AC voltage, applied to the first electrode 426a and the second electrode 426b of the respective electrode pairs, forms an electric field between the first electrode 426a and the second electrode 426b in the light-emitting space 430. Then, the electric field formed between the first electrode 426a and the second electrode 426b induces a discharge from inert gases filling the light-emitting space 430.

The discharge generated by the inert gases filling the light-emitting space 430 produces ultraviolet rays, and the ultraviolet rays excite the phosphor to thereby make the surface light-emitting lamp 420 to emit visible light. Accordingly, the surface light-emitting lamp 420 radiates visible light by a glow discharge of the phosphor, and the light irradiates from the entire surface of the surface light-emitting lamp.

The surface light-emitting lamp 420 of the liquid crystal display module according to the fourth embodiment of the invention can generate the light with a brightness higher than that of the light source used in a related art liquid crystal display module. Further, it is possible to make a light source with a same thickness irrespective of the size (or the area) of a light-emitting surface, and it is thus possible to reduce the thickness of the liquid crystal display module if the light source is employed in a large-scale liquid crystal display module.

The liquid crystal display module 400 according to the fourth embodiment of the invention can raise or lower the brightness of the surface light-emitting lamp 420 by simultaneously separately supplying electric fields with values different from each other to the light-emitting space 430 of the surface light-emitting lamp 420. Accordingly, it is possible to improve a display quality. Further, the construction of the back light unit becomes simplified, to thereby save time required to assemble the liquid crystal display module. Accordingly, it is possible to improve productivity.

As described above, according to the inventive surface light-emitting lamp of the liquid crystal display module, it is possible to generate light with higher brightness than that of the light source of a related art liquid crystal display module. Further, since the surface light-emitting lamp constitutes a light source with the same thickness irrespective of the size (or the area) of a light-emitting surface, it also becomes possible to decrease the thickness of the liquid crystal display module if the light source is employed in a large-scale liquid crystal display module.

Further, the inventive liquid crystal display module can drive an entire light-emitting surface to partially turn-on or turn-off by associating the emission of the surface light-emitting lamp with the picture data being provided to the liquid crystal display module, to thereby improve the display quality of a moving picture. In addition, independent control of the brightness of the respective light-emitting spaces can raise or lower the brightness by separately supply driving voltages or driving currents with values different from each other to the respective light-emitting spaces, thereby controlling the brightness at separate locations. Further, the construction of the back light unit is simplified to thereby save the time required to assemble the liquid crystal display module. Thus, it is possible to improve productivity.

Although the invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display module comprising:
   a liquid crystal display panel;
   a surface light-emitting lamp irradiating the liquid crystal display panel by a surface light-emission; and
   a power source supplying an electric power to the surface light-emitting lamp,
   wherein the surface light-emitting lamp includes:
   a frame having a plurality of light-emitting spaces; and
   a plurality of electrode pairs for generating electric fields in the light-emitting spaces, respectively, and
   wherein the electrode pairs include:
   a plurality of first electrodes, each first electrode generating an electric field in each of the light-emitting spaces; and
   a plurality of second electrodes, each second electrode corresponding to the first electrode and having a plurality of protrusions.

2. The liquid crystal display module according to claim 1, further comprising:
   a transparent substrate arranged on the frame.

3. The liquid crystal display module according to claim 1, further comprising:
   an inert gas filling the light-emitting spaces.

4. The liquid crystal display module according to claim 1, further comprising:
   a phosphor applied to an inside wall of each of the light-emitting spaces.

5. The liquid crystal display module according to claim 1, wherein each of the protrusions protrudes toward the first electrode adjacent to the second electrode.

6. The liquid crystal display module according to claim 1, wherein the power source comprises a plurality of power sources, each power source supplying electric power to each of the electrode pairs, respectively.

7. The liquid crystal display module according to claim 1, wherein the power source commonly supplies the electric power to each of the electrode pairs.

8. A surface light-emitting lamp for a display, comprising:
   a frame having a plurality of light-emitting spaces; and
   a plurality of electrode pairs for generating electric fields in the light-emitting spaces, respectively, wherein the electrode pairs include:
a plurality of first electrodes, each first electrode generating an electric field in each of the light-emitting spaces; and
a plurality of second electrodes, each second electrode corresponding to the first electrode and having a plurality of protrusions.

9. The surface light-emitting lamp according to claim 8, further comprising:
a transparent substrate arranged on the frame.

10. The surface light-emitting lamp according to claim 8, further comprising:
an inert gas filling the light-emitting spaces.

11. The surface light-emitting lamp according to claim 8, further comprising:
a phosphor applied to an inside wall of each of the light-emitting spaces.

12. The surface light-emitting lamp according to claim 8, wherein each of the protrusions protrudes toward the first electrode adjacent to the second electrode.

13. The surface light-emitting lamp according to claim 8, further comprising:
a plurality of power sources, each power source supplies electric power to each of the electrode pairs, respectively.

14. The surface light-emitting lamp according to claim 8, further comprising:
a power source that commonly supplies the electric power to each of the electrode pairs.

* * * * *